United States Patent [19]

Maucher et al.

[11] 4,010,654
[45] Mar. 8, 1977

[54] VARIABLE PULLEY PART FOR A DRIVE ACTING THROUGH A TENSION MEDIUM STRAND, SUCH AS A V-BELT

[75] Inventors: Paul Maucher, Sasbach; Karl Keck, Achern, both of Germany

[73] Assignee: LuK Lamellen und Kupplungsbau GmbH, Buhl, Germany

[22] Filed: Dec. 15, 1975

[21] Appl. No.: 640,650

[30] Foreign Application Priority Data
Dec. 14, 1974 Germany ............... 2459258

[52] U.S. Cl. .......................... 74/230.17 C
[51] Int. Cl.² ........................ F16H 55/52
[58] Field of Search ......... 74/230.17 C, 230.17 B, 74/230.17 A, 230.17 D, 217 R

[56] References Cited
UNITED STATES PATENTS 3,269,201  8/1966  Looker .................. 74/230.17 C
3,727,476  4/1973  Heidorn ................ 74/230.17 C X Primary Examiner—Leonard H. Gerin
Attorney, Agent, or Firm—Herbert L. Lerner

[57] ABSTRACT

Variable pulley for a drive acting through a tension medium strand includes two pulley parts, at least one of which is displaceable in axial direction relative to the other, each of the pulley parts having a running surface for a tension medium strand, at least one of the pulley parts being mounted on a shaft-like member, at least two systems having means mutually connecting the pulley parts to one another, the at least two systems being axially spaced from one another and affording axial displacement of the at least one pulley part, the systems, on the one hand, being firmly linked to the at least one pulley part and, on the other hand, having means for linking the systems to a part of a drive which is to act through a tension medium strand, the systems being synchronously and concentrically rotatable with the part of the drive.

32 Claims, 9 Drawing Figures

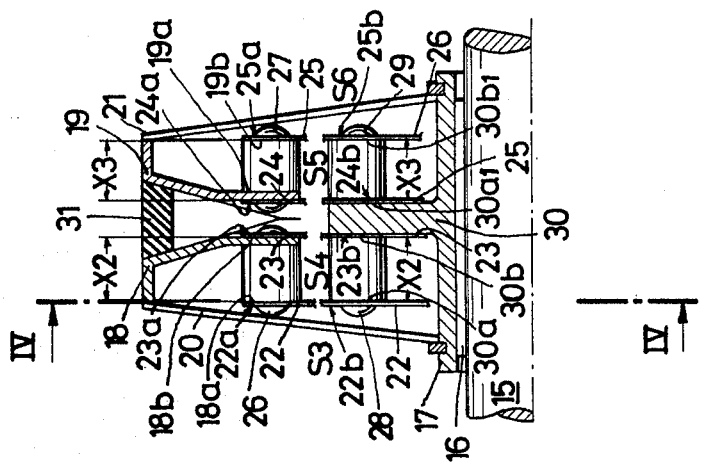
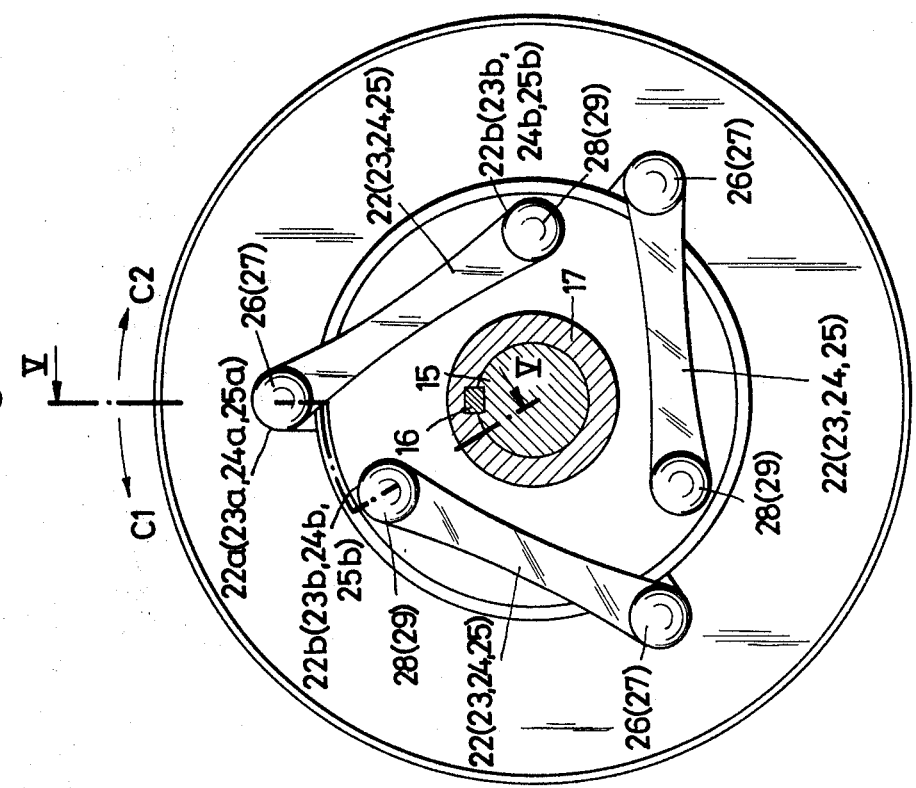

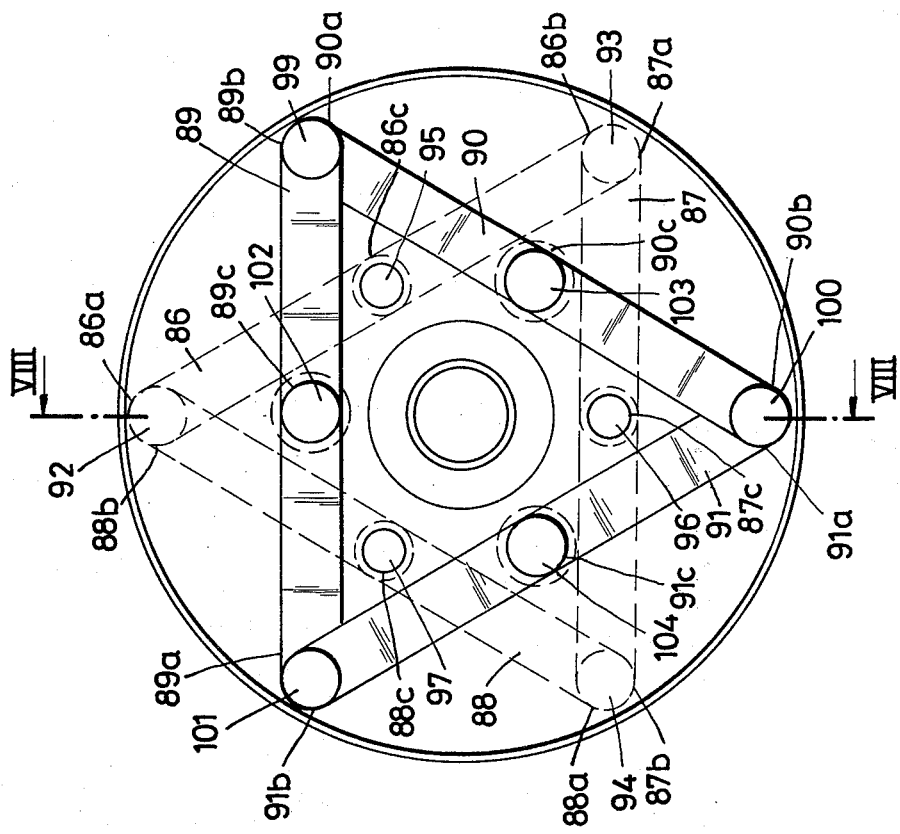
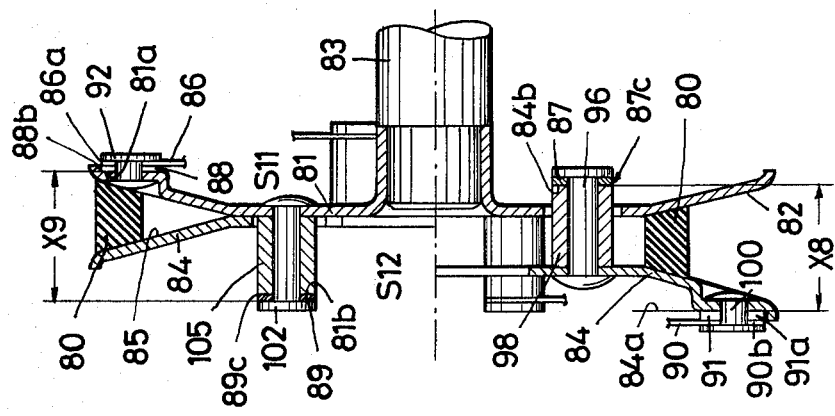

VARIABLE PULLEY PART FOR A DRIVE ACTING THROUGH A TENSION MEDIUM STRAND, SUCH AS A V-BELT

The invention relates to a variable pulley for a drive acting through a tension medium strand, such as a V-belt, and formed of two pulley parts that are movable relative to one another in axial direction, each having a running surface for the tension medium strand and of which at least one pulley part is provided on a member such as a shaft, and both pulley parts are secured against rotation relative to one another.

In such variable pulleys as have become known, for example, from German Petty patent DBGM 6 807 064 and German Patent DT-PS 939 360, either one of the pulley parts is axially secured and the other axially shiftable, or both pulley parts are axially displaceable.

The connection fixed against relative rotation or the entrainment and guidance of the respective, axially shiftable or displaceable pulley part is effected therein by keyways or splines. In such variable pulleys, considerable frictional forces and much wear occur due to the axial displacement. Tension medium strands such as, for example, V-belts, which are only partly looped around the pulley parts, produce a tilting or tipping moment, which acts upon the splines or the keyways and counteracts the axial displacement, so that, in addition to the wear caused thereby, there is an inability to effect sensitive control. The torque which is to be transmitted from the displaceable pulley to the shaft or vice versa and which impedes axial mobility, also causes the same disadvantages.

It is an object of the invention of the instant application to provide a variable pulley of the foregoing type wherein the foregoing drawbacks are eliminated. It is accordingly an object of the invention to provide such a variable pulley, by means of which friction-free and wear-free entrainment and guidance of the respective movable pulley part, and especially entrainment and guidance without the occurrence of fretting corrosion or galling, is accomplished, no matter whether it is a construction having only one or having two axially moving or displaceable pulley parts, and wherein, furthermore, concentric or coaxial support of the pulley parts relative to one another and parallel guidance of the respective axially displaceable pulley part i.e., guidance in a plane perpendicular to the axis of rotation, is ensured over the entire range of control.

With the foregoing and other objects in view, there is provided, in accordance with the invention, a variable pulley for a drive acting through a tension medium strand comprising two pulley parts, at least one of which is displaceable in axial direction relative to the other, each of the pulley parts having a running surface for a tension medium strand, at least one of the pulley parts being mounted on a shaft-like member, at least two systems having means mutually connecting the pulley parts to one another, the at least two systems being axially spaced from one another and affording axial displacement of the at least one pulley part, the systems, on the one hand, being firmly linked to the at least one pulley part and, on the other hand, having means for linking the systems to a part of a drive which is to act through a tension medium strand, the systems being synchronously and cencentrically rotatable with the part of the drive.

In accordance with another feature of the invention, the mutually connecting means of the two systems serve for transmitting a torque from the one to the other of the two pulley parts.

In accordance with a further feature of the invention, the mutually connecting means of the two systems serve for supporting the two pulley parts at a given rotary position relative to one another.

In accordance with an added feature of the invention, the connecting means of one of the systems is secured, on the one hand, to the respective axially displaceable at least one pulley part and, on the other hand, firmly linked to the part of the drive which is rotatable synchronously and concentrically with the at least one pulley part, and the connecting means of the other of the systems is secured, on the one hand, to the part of the drive which is rotatable synchronously and concentrically with the at least one pulley part and, on the other hand, to the respective axially displaceable at least one pulley part.

In accordance with an additional feature of the invention, the variable pulley includes a first point of connection at which at least one means forming part of the connecting means of the one of the systems is firmly linked, on the one hand, with the respective axially displaceable at least one pulley part, a second point of connection at which at least one means forming part of the connecting means of the other of the systems is firmly linked on the other hand, with the respectively axially displaceable at least one pulley part, a third point of connection at which at least one means forming part of the connecting means of the one of the systems is firmly linked, on the other hand, to the part of the drive which is rotatable synchronously and concentrically with the at least one axially displaceable pulley part, and a fourth point of connection at which at least one means forming part of the connecting means of the other of the systems is firmly linked, on the other hand, to the part of the drive which is rotatable synchronously and concentrically with the at least one axially displaceable pulley part, the first point of connection being axially spaced from the second point of connection, and the third point of connection being axially spaced from the fourth point of connection, the axial spacing between the first and second points of connection being equal to the axial spacing between the third and fourth points of connection.

In accordance with yet another feature of the invention, the spacings between points of connection at which the connecting means are firmly linked, on the one hand, to the respective axially displaceable at least one pulley part and, on the other hand to the part of the drive which is synchronously and concentrically rotatable with the respectively axially displaceable at least one pulley part, at least within one of the two systems, are of equal size.

In accordance with yet a further feature of the invention, the variable pulley includes first points of connection at which the connecting means of one of the systems are firmly linked, on the one hand, to the respective axially displaceable one pulley part, and second points of connection at which the connecting means of the other of the systems are secured, on the one hand, to the part of the drive which is rotatable synchronously and concentrically with the respective axially displaceable one pulley part, both the first and the second points of connection being respectively on the same diameter.

In accordance with an additional feature of the invention, the variable pulley includes third points of connection at which the connecting means of the one of the systems are firmly linked, on the other hand, to the part of the drive which is rotatable synchronously and concentrically with the respective axially displaceable one pulley part, and fourth points of connection at which the connecting means of the other of the systems are firmly linked, on the other hand, to the respective axially displaceable one pulley part, both the third and the first points of connection being respectively on the same diameter.

Through this measure, a deformation of the connecting means i.e. the support means, which is as uniform as possible, is assured during the axial displacement of the pulley parts, and furthermore, that the thereby produced stresses in the connecting means or the torque-transmission or support means are minimized. Similarly, the twist or torsion of the pulley parts relative to one another, which occurs over the axial displacement is minimized, and furthermore, absolutely concentric or coaxial support of the pulley parts relative to one another is assured.

In accordance with an additional feature of the invention, the systems affording axial displacement of the at least one pulley part are connected, fixed against relative rotation, to a shaft of the drive which is rotatable synchronously and concentrically with the at least one pulley part.

In accordance with yet another feature of the invention, the systems affording axial displacement of the one pulley part are connected, fixed against relative rotation, to the other pulley part, such as by riveting or bolting the parts together.

If both pulley parts are axially displaceable, then the connection, fixed against relative rotation, of the two pulley parts to one another can be accomplished so that each of the axially displaceable pulley parts is firmly connected to a part of the drive which rotates synchronously and concentrically with the respective pulley part, by means of two systems of torque-transmission or support means, respectively. This part of the drive may again be an input or output shaft. However, the construction can also be such that one of the pulley parts is connected, for example, to the aforementioned shaft through the respective two systems of torque-transmission or support means, and the other pulley part is linked with the one pulley part through two further systems of torque-transmission or support means.

Hereinafter following, some of the possible kinds of connecting means i.e., torque-transmission or support means, are described as specific embodiments, in which the two systems may either be similar, or two different systems can be used side by side.

Such torque-transmission or support means, in accordance with the invention, may, for example, be joints consisting of a tie rod with two articulating heads, one of which is firmly linked to the respective one pulley part and the other to the part of the drive which rotates synchronously and concentrically with the one pulley part, the joints being constructed so that a displacement of the one articulating head relative to the other is possible only in axial direction.

The connecting means or torque-transmission or support means of the invention may also be formed, however, of spring material bent into a U-shape e.g., of spring rods, one of the legs thereof being firmly linked, for example by being forced-in, on the one hand, to the axially displaceable pulley part and, on the other hand, to the part of the drive which rotates synchronously and concentrically with the axially displaceable pulley part.

At least one system of the connecting means or torque-transmission or support means may also be formed, for example, by a diaphragm.

In accordance with another feature of the invention each of the systems includes means for connecting the two pulley parts to one another.

In accordance with a further feature of the invention, each of the systems includes a plurality of means for connecting the two pulley parts to one another.

In accordance with an added feature of the invention, the connecting means are formed of flexible, leaf spring-like metal members.

In accordance with an additional feature of the invention, the connecting means, as viewed in axial direction, extend chordlike to the pulley parts.

In accordance with a concomitant feature of the invention, the conducting means, as viewed in direction of force flow through the pulley, are stressed in tension.

In accordance with other features of the invention, the connecting means or torque-transmission or support means may also be formed by leaf spring elements that are in triangular, rectangular or other form, and may be provided with corrugations for longitudinal compensation or equalization for the axial displacement, as may also those leaf spring elements that have an elongated form or are constructed as diaphragms.

In accordance with another feature of the invention, at least one of the points of connection is located radially within the smallest possible diameter of the pulley subjectible to the tension medium strand.

In accordance with a further feature of the invention, the connecting means of one of the systems are firmly linked at at least two connecting points to the at least one axially displaceable pulley part and are also firmly linked at at least one connecting point to the part of the drive which is rotatable synchronously and concentrically with the one axially displaceable pulley part; and the connecting means of the other of the systems are firmly linked to the part of the drive which is rotatable synchronously and concentrically with the one axially displaceable pulley part and are also firmly linked at at least one connecting point to the respective axially displaceable pulley part. Such an embodiment accordingly assures the advantage of independence from the direction of force flow to an especially great extent.

In accordance with an added feature of the invention, the connecting means of both the systems, as viewed perpendicularly to the axis of the pulley, are located, respectively, on both sides of the tension medium strand.

In accordance with an additional feature of the invention the connecting means of one of the systems are secured at at least one connecting point, on the one hand, to the respective axialary displaceable pulley part and, on the other hand, to spacer means extending in axial direction through the axially displaceable pulley part and disposed at the part of the drive which is rotatable synchronously and concentrically to the axially displaceable pulley part; and the connecting means of the other of the systems are secured at at least one connecting point, on the one hand, to the other of the pulley parts and, on the other hand, to spacer means extending in axial direction through the other of the pulley parts and disposed at the respective axially displaceable pulley part.

In accordance with yet another feature of the invention, the connecting means exert an axial pre-tensioning force upon the respective axially displaceable pulley part.

In accordance with yet a further feature of the invention, the connecting means exert an axial pre-tensioning force on the pulley parts mutually urging the pulley parts towards one another.

In accordance with another feature of the invention, the variable pulley includes compression spring means for urging the pulley parts toward one another, and more specifically in accordance with the invention, the compression spring means comprise a plate spring.

According to a further feature of the invention, the variable pulley such as described hereinbefore, can also be used as tightener or tensioning pulleys for the tension medium strand such as, for example, self-tightening pulleys. The tightener pulleys that have become known heretofore have considerable shortcomings. Thus, in the case of tighteners which operate in accordance with the principle of varying the shaft spacing or clearance, it is very difficult to adjust the belt tension. Constructions wherein the tightener or tensioner pulleys are swingably or pivotably mounted and are biased against the belt by means of a spring, are expensive. This also produces an unfavorable stress in the belt, because the tightener or tensioner must usually be so disposed as to press against the upper side of the belt and, thereby, alternating flexural stresses are produced in the belt. Belt pulleys with variable diameter have furthermore become known heretofore. Such known belt pulleys have two pulley parts which are bolted or screwed together. The disired belt tension must be determined empirically by inserting spacer washers. However, this is laborious and time-consuming. With the belt tighterner pulley constructed in accordance with the invention, however, assurance is provided through an appropriate selection of the pretensioning force of the connecting means i.e., the torque-transmission or support means, and/or through the additional tensioning spring, that the belt will always have the same tension even for relatively high expansion values. The belt tension is therefore always regulated to the predetermined value automatically.

In accordance with the use of the variable pulley as a speed control pulley in a transmission, it is particularly advantageous to apply the superimposed values of the spring characteristics of the torque-transmission or support means and/or the pressure spring and/or the belt train and, in addition, centrifugal-force regulation, for changing the transmission ratio.

In accordance with a further feature of the invention, the variable pulley serves as a speed control pulley for a transmission system, and includes compression spring means in the form of at least one plate spring urging the pulley parts toward one another, said compression spring means being located on at least one side of the primary and secondary sides of the transmission, and including centrifugal weights on said compression spring means. Thus, when the variable pulley according to the invention is used as a speed control pulley, the axial pretensioning force serves for control purposes.

In accordance with a further feature of the invention, the variable pulley can be used as a drive for auxiliary or accessory motor vehicle units such as generators, blowers or fans, compressors for air conditioning equipment, water pumps, power steering and brake pumps and the like. As is well known, the internalcombustion engine in motor vehicles is operated over a very wide range of speeds with the result that such auxiliary units must be designed, as far as their performance is concerned, for the engine idling speed or, an average engine speed. Designs based on both such speeds have considerable drawbacks. If the generator or the blower, for example, is designed for the lower speed range, it must be constructed relatively large and comsumes very great amounts of power at high speeds and therefore reduces the nominal power of drive motor considerably. If the generator or the blower, on the other hand, is constructed for an average speed range of the internal combustion engine, the supply of a motor vehicle with electric power is in many cases insufficient in the lower speed range, and similarly, the required cooling through the fan or blower is insufficient. The situation is similar with other motor vehicle accessories. It is therefore a further object of the invention of the instant application to eliminate these shortcomings and to provide a drive for motor vehicle auxiliaries or accessories which affords, at low rotary speed of the drive motor, a higher rotary speed of the auxiliaries or accessories and, at high rotary speed, a regulation or control of the auxiliaries or accessories to a speed that is at least approximately constant.

In accordance with an added feature of the invention, the centrifugal weights are located on the compression spring means on the primary side of the transmission i.e. for example, fixed against rotation relative to the crankshaft of an internal combustion engine, so as to effect a widening of the spacing between the pulley parts against the applied force of the compression spring means, with increasing rotary speed of the transmission. A variable pulley may be provided on the secondary side which merely adjusts the proper diameter through the tensioning means, and speed control is effected by such a drive because the controlled variable per se i.e. the output speed, has no effect on the speed of the auxiliary or accessory unit.

In accordance with an additional feature of the invention, the centrifugal weights are located on the compression spring means on the secondary side of the transmission, for example on the generator or the fan shaft or the like, so as to effect a narrowing of the spacing between the pulley parts in the direction of the applied force of the compression spring means with increasing rotary speed of the transmission.

Thus, there can be provided on the primary side, either a variable pulley which merely adjusts the proper diameter through the tensioning means, or the aforementioned variable pulley wherein the centrifugal weights cause the space between the pulley parts to widen with increasing speed against the direction of applied force of the tensioning means.

In accordance with another feature of the invention, the centrifugal weights are provided on the compression spring means, such as a plate spring, on the primary side as well as on the compression spring means, also a plate spring, for example, on the secondary side of the transmission so as to effect on the primary side a widening of the spacing between the pulley parts against the applied force of the compression spring means, with increasing rotary speed of the transmission, and so as to effect on the secondary side a narrowing of the spacing between the pulley parts in the direction of the applied force of the compression spring means, with increasing rotary speed of the transmission.

In accordance with a further feature of the invention, the centrifugal weights are so disposed on the compression spring means on the primary side of the transmission so as to effect a narrowing of the spacing between the pulley parts in the direction of the applied force of the compression spring means, with increasing rotary speed of the transmission.

In accordance with an added feature of the invention, the centrifugal weights are so disposed on the compression spring means on the secondary side of the transmission so as to effect a widening of the spacing between the pulley parts against the applied force of the compression spring means, with increasing rotary speed of the transmission.

In accordance with an additional feature of the invention, the centrifugal weights are so disposed on the compression spring means on the primary side as well as on the compression spring means on the secondary side of the transmission so as to effect, on the primary side, a narrowing of the spacing between the pulley parts in the direction of the applied force of the compression spring means, with increasing rotary speed, and so as to effect, on the secondary side, a widening of the spacing between the pulley parts against the applied force of the compression spring means, with increasing rotary speed.

A variable pulley according to the present invention can also find application, in accordance with the invention, in a variable drive, wherein the respective axially displaceable pulley part is adjustable other means acting thereon in axial direction e.g. through a worm drive, a hydraulic or pneumatic cylinder or the like.

In accordance with a further feature of the invention, the compression spring means comprises at least one plate or cup spring as the tensioning means, and the centrifugal weight is formed of the plate or cup spring per se, in that strips are punched out of the base material of the plate or cup spring in an appropriate direction, for example, always between two adjacent, inwardly-projecting tabs of the plate of cup spring, and these strips are bent-or formed at an angle outwardly in such a manner that, with increasing rotary speed, they cause the cup or plate spring and, therefore, the respective axially displaceable pulley part to be displaced.

In accordance with a concomitant feature of the invention, the variable pulley serves as a variable drive, and includes adjusting means applicable in axial direction to the respective axially displaceable pulley part for adjusting the spacing between the axially displaceable pulley part and the other pulley part.

Other features which are considered as characteristic for the invention are set forth in the appended claims.

Although the invention is illustrated and described herein as embodied in a variable pulley for a drive acting through a tension medium strand, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 4 and 5 are views of the variable pulley of the invention as another embodiment of a self-tensioning or tightener pulley, FIG. 4 thereof being a sectional view of FIG. 5 taken along the line IV—IV, and FIG. 5 being a cross-sectional view of FIG. 4 taken along the irregular line V—V;

Figure 6:
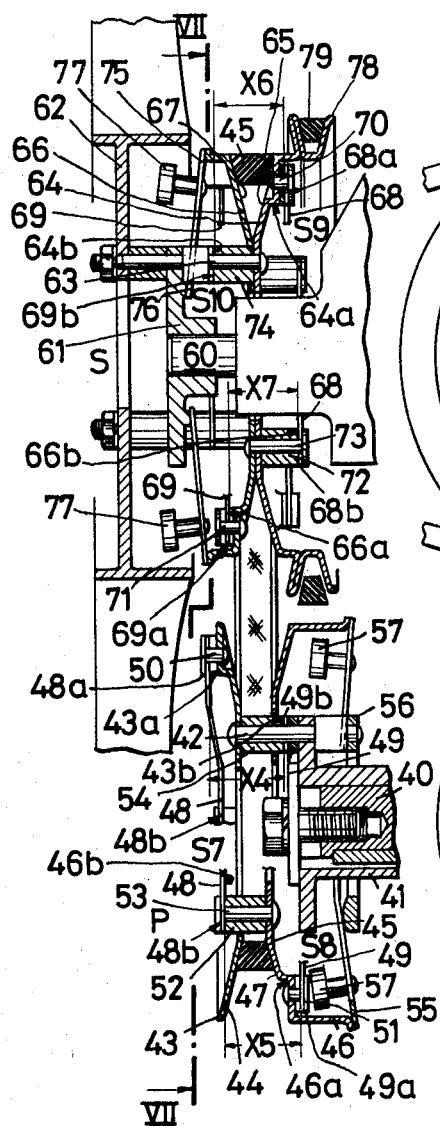
Figure 7:
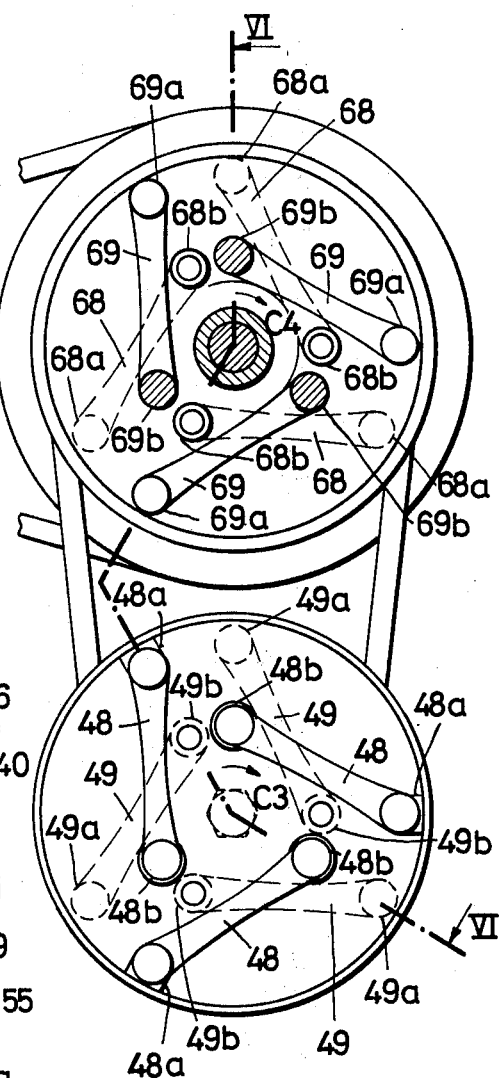

FIGS. 6 and 7 are views of the variable pulley of the invention forming part of a drive for motor vehicle auxiliary or accessory equipment, FIG. 6 thereof being a cross-sectional view of FIG. 7 taken along the irregular line VI—VI, and FIG. 7 being a sectional view of FIG. 6 taken along the irregular line VII—VII; and FIGS. 8 and 9 are views of yet another embodiment of the variable pulley of the invention serving as a self-tensioning or tightener pulley, FIG. 8 being a cross-sectional of FIG. 9 taken along the line XIII—XIII, and FIG. 9 being an elevational view of the control pulley.

Figure 1:
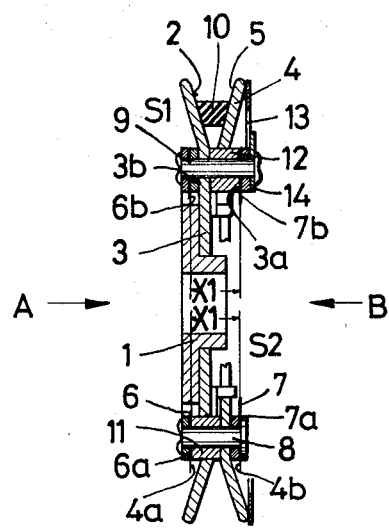
FIGS. 1 to 3 are views of the variable pulley of the invention embodied as a self-tensioning or tightener pulley, FIG. 1 thereof being a cross-sectional view of FIG. 2 taken along the line I—I, FIG. 2 being an elevational view as seen in direction of the arrow A in FIG. 1, and FIG. 3 being an elevational view as seen in direction of the arrow B in FIG. 1.
Figure 2:
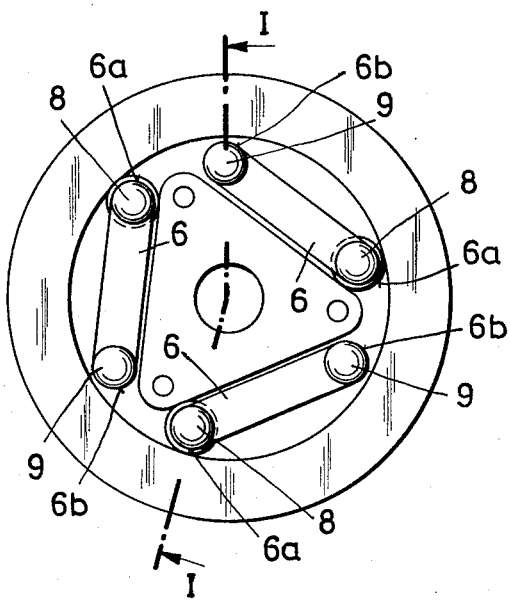
Figure 3:
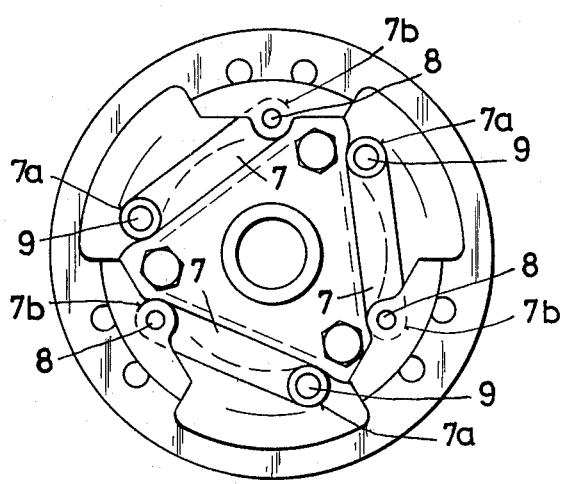

Referring now to the drawing and first, particularly, to FIGS. 1 to 3 thereof, there is shown a flange 1, which can be secured on a nonillustrated shaft. An axially fixed pulley part 3 is fastened on the flange 1 and has a running surface 2 for a V-belt 10. A pulley part 4, which is displaceable in axial direction relative to the pulley part 3, has a running surface 5 and is connected, fixed against relative rotation, to the pulley part 3 by means of two systems S1 and S2 of leaf spring elements 6 and 7 which are disposed in the force transmission path between the two pulley parts 3 and 4. The leaf spring elements 6 and 7 are located at an axial spacing from one another. They permit displacement of the pulley part 4 and are fixed in the direction of rotation. The three leaf spring elements 6 of the one system S1 are shown in FIG. 2, and the three leaf spring elements 7 of the system S2 are shown in FIG. 3. Each of the leaf spring elements 6 and 7 is firmly linked by one end thereof i.e. the respective ends 6a and 7a, on the one hand, to the axially movable pulley part 4 at connecting points 4a and 4b by means of rivets 8 and, on the other hand, by means of the ends 6b and 7b thereof to the part of the drive that (here at the axially fixed pulley part 3) is synchronously and concentrically rotatable with this pulley part namely through the points of connection 3a and 3b thereof by means of rivets 9.

The two systems S1 and S2 are located on both sides of the tension medium strand i.e. the V-belt 10, as viewed in a direction perpendicular to the axis in FIG. 1, which yields a construction that is particularly space-saving in axial direction. The leaf springs 6 of the one system S1 are fastened, respectively, by their one end or point of connection, on the one hand, to the fixed pulley part 3 at the points of connection 3b, and by the other end or point of connection 6a thereof, on the other hand, to spacers 11, which are provided at the other pulley part 4 and extend in axial direction through the fixed pulley part 3, or to the points of connection 4a of the spacers 11. In contrast thereto, the leaf springs 7 of the other system S2 are firmly linked with the end or point of connection 7a thereof, on the one hand, to the axially movable pulley part 4 and its point of connection 4b and, on the other hand, with the end or point of connection 7b thereof to spacers 12, that are provided at the pulley part 3 or to the points of connection 3a thereof, and extend in axial direction through the pulley part 4.

In the embodiment shown in FIGS. 1 to 3, the points of connection 3a and 3b as well as the connecting points 4a and 4b for the two leaf spring systems S1 and S2 are each provided on a congruent diameter and the leaf spring elements 6 and 7 of the two systems are of equal length. The axial spacing X1 between the points of connection 3a and 3b as well as between the points 4a and 4b is equal. It is evident that the pulley part 4 is entrained through the leaf spring elements, fixed against relative rotation, and furthermore, this pulley part 4 is held concentrically and with rotational symmetry relative to the axially fixed pulley part 3. Axial displacement of the pulley part 4 occurs, due to the mounting thereof, by means of the leaf spring elements, similarly axially parallel and concentric to the pulley part 3 and, in particular, the pulley part 4 is displaceable without friction.

The leaf spring elements 6 and 7 of the two systems S1 and S2 are disposed opposite one another in congruent positions. They occupy positions parallel to one another, when viewed, respectively, from the same direction, in every position of the pulley parts.

The leaf spring elements 6 and 7 may be constructed in such a way that they cause tensioning of the two pulley parts with respect to one another. To this end, the leaf spring elements 6 and 7 can be riveted under prestressing conditions, in that they can be, for example, suitably bent beforehand and thus ensure that a predeterminable tension will always be exerted on the belt 10, so that stretching of the belt 10 during operation will be compensated for and the belt tension can also remain at least approximately constant. This pretensioning of the two pulley parts with respect to each other can also be effected, however, if desired, by means of a plate or cup spring 13 which, on the one hand, abuts against the pulley part 4 and, on the other hand, against a support 14.

The flange 1 can be mounted, for example, on a rotatable shaft or on an axle, possibly with the interposition of a bearing. It may be advantageous, for the direction of flow of the force introduced through the belt 10 to be in the direction of arrow C, so that the leaf spring elements are stressed in tension. Referring now to the embodiment shown in FIGS. 4 and 5, a connection fixed against relative rotation, is formed with a hub 17 by means of a key 16 on a shaft 15, which may be an output or an input shaft or even a shaft which serves merely for supporting the tightener pulley.

In the embodiment of FIGS. 4 and 5, the pulley parts 18 and 19 are constructed so that both of them are axially displaceable. The two pulley parts 18 and 19 are pressed together by means of plate or cup springs 20 and 21. The support or torque transmission from the shaft 15 to the pulley parts 18 and 19 or vice versa is accomplished in the embodiment of FIGS. 4 and 5 by the provision that each of the pulley parts 18 and 19 are connected to the shaft 15 by means of two systems each i.e. S3, S4 and S5, S6, formed, respectively, of three leaf springs 22, 23 and 24, 25 each. As viewed in axial direction, these leaf springs lie on top of each other in congruent positions and are linked firmly by the outer points of connection 22a, 23a, 24a, 25a thereof through rivets 26 and 27 to the pulley part 18 and 19, respectively, at the connection points of the latter 18a, 18b, 19a, 19b. With the points of connection 22b, 23b, 24b, 25b thereof, which are provided radially further inwardly, these leaf springs are firmly linked through rivets 28 and 29 to a flange 30 of the hub 17 and, in fact, through the points of connection 30a, 30b, 30a1, 30b1. The axial spacing X2 between the points of connection 18a and 18b as well as between the points 30a and 30b is equal and, likewise, the axial spacing X3 between the points of connection 19a and 19b as well as between the points 30a1 and 30b1. It is advantageous if the axial spacing X2 and X3 are equal also, because then, a In the embodiment of FIGS. 6 and 7, an axially fixed pulley part 43 having a running surface 44 for a V-belt 45 is fastened, through a hub 41 and rivets 42, at the primary side P of the transmission, on the crankshaft 40 of an internal-combustion engine, fixed axially and against relative rotation. An axially displaceable pulley part 46 having a running surface 47 for the V-belt 45 is linked through two systems S7 and S8 of torquetransmission means or support means formed of three leaf springs 48 and 49 each, the system S7 and S8 being provided at an axial spacing from one another at both sides of the V-belt 45, interlinked with the axially fixed disk 43 and held axially displaceably, concentrically as well as without friction with respect to the former. The leaf springs 48, and 49 are riveted by means of the respective points of attachment or ends 48a and 49a thereof radially outwardly to the pulley parts 43 and 46, more specifically through rivets 50 and 51. Radially further inwardly, the attachment points 48b of the leaf springs 48 are fastened through rivets 53 and through spacers 52, which are provided at the axially movable disk 46 and extend through the axially fixed disk 43, while the attachment points 49b of the leaf springs 49 lying also further inwardly, are firmly riveted through spacers 54, which are provided at the axially fixed disk 43, extend through the axially displaceable pulley part 46 and are firmly linked through the aforementioned rivets 42, which connect the axially fixed disk 43 to the hub 41.

The attachment points or ends 48a and 49b are disposed at the points of connection 43a and 43b of the pulley part 43 at an axial distance X4 therebetween, and the attachment points or ends 48b and 49a are located at the points of connection 46a and 46b at an axial distance X5 therebetween.

The axial spacing X4 between the points of connection 43a for the system S7 of the torque-transmission means or support means 48 in the radially outer region and the points of connection 43b for the leaf spring system S8 of the torque-transmission means or support means 49 in the radially inner region, on the one hand, and the axial spacing X5 i.e., the respective axial distance between the points of connection 46b for the system S7 of the torque-transmission means or support means 48 in the radially inner region and the points of connection 46a of the other leaf spring system S8 of the torque-transmission means or support means 49 in the radially outer region, on the other hand, are equal to one another. The axial distances X4 and X5 remain equal in all positions also if the axially movable pulley part 46 is displaced, and the leaf spring elements 48 and 49 occupy mutually parallel positions in every position of the axially displaceable pulley part 46, as viewed, respectively, in the same direction.

Furthermore, the points of connection 43a and 46a are provided, amongst one another, on the same diameter, and likewise, the points of attachment 43b and 46b, the points of attachment 48a and 48b as well as the attachment points 49a and 49b or the corresponding points of connection are equally spaced one from the other i.e., the leaf springs 48 and 49 are of equal length over their effective range. Assurance is thereby provided that uniform deformation of the leaf springs occurs when the pulley part 46 is axially displaced and the tensions caused thereby are as low as possible, and the relative rotation of the pulley parts with respect to each other is uniform. The disposition or attachment of the leaf spring elements 48 and 49 is effected in the embodiment of FIGS. 6 and 7 so that the spring elements 48 and 49 are stressed in tension if the rotation is in the direction of the arrow C3 (FIG. 7) and the flow of the force goes from the axially fixed pulley part to the axially movable pulley part.

A plate or cup spring 55 is supported at the one side thereof with its outer diameter against the axially movable pulley part 46 and radially further inwardly, against a ring 56 held in place through the rivets 42; on the plate or cup spring 55, there are further fastened centrifugal weights 57 which act against the biasing force of the plate or cup spring 55, as the speed increases, and cause, at high speed, axial displacement of the axially movable pulley part 46 away from the axially fixed pulley part 43, a condition that is actually shown in FIG. 6, so that the effective engagement diameter of the V-belt 45 is reduced in the sense of a reduction in the speed of rotation at the secondary side S of the transmission.

At the secondary side S of the transmission, a hub 61 is mounted on a water pump shaft 60, fixed against axial displacement and relative rotation. On this hub 61, there is first provided a fan 62 and, through rivets 63, an axially fixed pulley part 64 having a running surface 65 for the V-belt 45. The other pulley part 66 having a running surface 67 for the V-belt 45 is likewise linked through two systems S9 and S10 of torque-transmission means or support means, which are axially spaced from one another and located at both sides of the V-belt and which are formed of three leaf springs 68 and 69 each, interlinked with the axially fixed disk 64 and supported concentrically and without friction relative to the latter. The leaf springs 68 and 69 are firmly linked through the respective attachment points or ends 68a and 69a thereof radially outwardly to the pulley parts 64 and 66 at the points of connection 64a and 66a by means of rivets 70 and 71. Radially further inwardly, the attachment points or ends of the leaf springs 68 are fastened by means of rivets 73 to the points of connection 66b through spacers 72, which are provided at the axially movable pulley part 66 and extend through the axially fixed pulley part, while the attachment points or ends 69b of the leaf spring 69, which likewise lie radially further inwardly, are firmly riveted through spacers 74 provided at the axially spaced pulley part 64 and the points of connection 64b. The spacers 74 extend through the axially displaceable pulley part 66 and, through the hereinaforementioned rivets 63 which connect the axially fixed pulley part 64 with the hub 61, the attachment points or ends 69b are firmly linked thereon. The points of connection 64a and 66a are provided among on another on the same diameter, and the points of connection 64b and 66b likewise. Between the attachment points 68a and 68b as well as between the points 69a and 69b and the corresponding points of connection 64a and 66b as well as the points 66a and 64b, equal distances are provided i.e., the leaf springs 68 and 69 are of equal length over their effective range, so that, as on the primary side P, assurance is provided that a uniform deformation of the leaf springs occurs if the pulley part 66 is axially displaced, and the stresses caused thereby are minimized and the relative torsion of the pulley parts with respect to each other is uniform. Furthermore, the disposition or attachment of the leaf spring elements 68 and 69 is also here effected in such a manner that the latter are stressed in tension if the rotation is in the direction of the arrow C4 (FIG. 7) and the force flows from the axially movable pulley part to the axially fixed pulley part.

A plate or cup spring 75 is supported by the radially outer region thereof against the axially movable pulley part 66 and by the radially inner region thereof against a bead 76 formed on the hub 61. Centrifugal weights 77 are attached to the plate or cup spring 75. The plate or cup spring 75 exerts a force on the axially movable pulley part in direction toward the axially fixed pulley part. The centrifugal weights are constructed or disposed so that they aid or reinforce the bias of the plate or cup spring 75 with increasing speed of the secondary side and cause the pulley parts to close, so that the effective engagement diameter of the V-belt is increased and the speed of the secondary side is reduced.

A construction is also possible, however, wherein centrifugal control is applied only on the primary side P, by providing centrifugal weights only on the plate or cup spring 55 and tensioning means only on the secondary side, e.g., in the form of the plate or cup spring 75 or a coil spring or the like. The leaf springs 68 and 69 can also, however, be constructed or disposed in such a way that they produce the mutual tensioning force of the two pulley parts, either by themselves alone or in addition to the aforementioned plate or cup springs 55 and 75 so that only the corresponding diameter is adjusted through the tensioning means.

Such a transmission provides only speed control.

In addition, an embodiment is possible, wherein centrifugal control takes place only on the secondary side, for example in the manner shown, and tensioning means, for example in the aforedescribed manner, are provided on the primary side. In this case, true speed control is achieved, since the value to be controlled i.e., the output speed, is utilized as the controlled variable.

Further units, for example the generator, a compressor for an air conditioner, a pump steering or braking or the like can be driven by means of a V-belt pulley 78 provided at the axially fixed pulley part 64, as well as a V-belt 79; these units are then also driven with substantially constant speed of rotation.

The superimposed values of the spring characteristic of the pressure spring, the belt tension, the centrifugal force and possibly also the value of the spring characteristic of the leaf springs can be utilized for the control.

With respect to the embodiment of FIGS. 8 and 9, it is noted initially that in the upper part of FIG. 8, the V-belt 80 is shown at maximum diameter and in the lower half thereof, at minimum diameter. As shown in FIG. 8, the axially fixed pulley part 81 having a running surface 82 for the V-belt 80 is fastened on a shaft 83. The axially displaceable pulley part 84 having a running surface 85 for the V-belt 80 is linked to the axially fixed pulley part 81 through the systems S11 and S12 which are provided on both sides of the V-belt 80. The system S11 is made up of three leaf spring elements 86, 87 and 88, and the system S12 of three leaf spring elements 89, 90 and 91.

The leaf springs of the system S11 are linked through the attachment points 86a, 86b and 87a, 87b and 88a, 88b provided at the ends thereof to the axially fixed pulley part 81 by means of rivets 92, 93 and 94 at the points of connection 81a in the radially outer region of the fixed pulley part 81. Through the attachment points 86c, 87c and 88c thereof, which are always located in-between and radially further inwardly, each of these leaf spring elements is firmly linked to the other, namely the axially displaceable pulley part at the points of connection 84b through rivets 95, 96 and 97, with the interposition of spacer sleeves 98, which extend through the axially fixed pulley part 82.

In an equivalent manner, the leaf springs 89, 90 and 91 of the system S12 are fastened at the axially displaceable pulley part radially outwardly by means of rivets 99, 100 and 101 through the respective attachment points 89a, 89b and 90a, 90b as well as 91a, 91b thereof provided at the ends, and more specifically, at the points of connection 84a; and through the attachment points 89c, 90c, 91c thereof which lie in-between and radially further inwardly, by means of rivets 102, 103, 104, at the axially fixed pulley part 81, with the interposition of spacer sleeves 105, specifically at the points of connection 81b.

It will be seen that here, too, the comparable points of connection 84a, through which the leaf springs 89, 90 and 91 of the one system S12 are firmly linked, on the one hand, to the respective axially displaceable pulley part 84, and the points of connection 81a are attached through the leaf springs 86, 87 and 88 of the other system S11, on the one hand, to the axially fixed pulley part 81, are provided among themselves always on the same diameter; and likewise the points of connection 81b, through which the leaf springs 89, 90 and 91 of the one system S12 are firmly linked to the axially fixed pulley part 81, on the other hand, and the points of connection 84b, through which the means 86, 87 and 88 of the other system S11 are firmly linked on the other hand to the respective axially displaceable pulley part 84, are provided on the same diameter.

Furthermore, the axial distance X8 between the points of connection 84a through which the means 89, 90 and 91 of the one system S12, on the one hand, are firmly linked to the respective axially displaceable pulley part 84, and the point of connection 84b, through which the means 86, 87 and 88 of the other system are firmly linked, on the other hand, to the axially displaceable pulley part 84, is the same, as is the axial distance X9 between the point of connection 81b, through which the means 89, 90 and 91 of the one system S12 are firmly linked, on the other hand, to the axially fixed pulley part 81, and the points of connection 81a, through which the means 86, 87 and 88 of the other system S11 are linked to the axially fixed pulley part 81. Torque transmission can thus take place in both directions of rotation.

The invention is not limited to the aforedescribed and illustrated embodiments. Thus it is possible, for example, to combine the respective axially displaceable pulley part through more than two systems of torque-transmission means or support means with a part of the drive that is synchronously and concentrically rotatable with this displaceable pulley part i.e., for example, with an axially fixed pulley part. It is furthermore possible to provide the at least two systems always on the same side of the variable pulley. If the variable pulley is used within a transmission, control of the speed of rotation or control from the primary side and/or the secondary side can be effected and, more specifically, in a step-up or step-down sense. Similarly, values other than the centrifugal force can be utilized for control purposes or, however, other adjusting means such as, for example, hydraulic, pneumatic or mechanical adjusting means or the like. In addition, as mentioned hereinbefore, torque-transmission means or support means other than those shown or described herein can be used.

There is claimed:

1. Variable pulley for a drive acting through a tension medium strand comprising two pulley parts, at least one of which is displaceable in axial direction relative to the other, each of said pulley parts having a running surface for a tension medium strand, at least one of said pulley parts being mounted on a shaft-like member, at least two systems having means mutually connecting said pulley parts to one another, said at least two systems being axially spaced from one another and affording axial displacement of said at least one pulley part, said systems, on the one hand, being firmly linked to said at least one pulley part and, on the other hand, having means for linking said systems to a part of a drive which is to act through a tension medium strand, said systems being synchronously and concentrically rotatable with the part of the drive.

2. Variable pulley according to claim 1 wherein said mutually connecting means of said two systems serve for transmitting a torque from the one to the other of said two pulley parts.

3. Variable pulley according to claim 1 wherein said mutually connecting means of said two systems serve for supporting said two pulley parts at a given rotary position relative to one another.

4. Variable pulley according to claim 1 wherein said connecting means of one of said systems is secured, on the one hand, to the respective axially displaceable at least one pulley part and, on the other hand, firmly linked to the part of the drive which is rotatable synchronously and concentrically with said at least one pulley part, and said connecting means of the other of said systems is secured, on the one hand, to the part of the drive which is rotatable synchronously and concentrically with said at least one pulley part and, on the other hand, to the respective axially displaceable at least one pulley part.

5. Variable pulley according to claim 1 including a first point of connection at which at least one means forming part of said connecting means of said one of said systems is firmly linked, on the one hand, with the respective axially displaceable at least one pulley part, a second point of connection at which at least one means forming part of said connecting means of said other of said systems is firmly linked on the other hand, with said respectively axially displaceable at least one pulley part, a third point of connection at which at least one means forming part of said connecting means of said one of said systems is firmly linked, on the other hand, to the part of the drive which is rotatable synchronously and concentrically with said at least one axially displaceable pulley part, and a fourth point of connection at which at least one means forming part of said connecting means of said other of said systems is firmly linked, on the other hand, to the part of the drive which is rotatable synchronously and concentrically with said at least one axially displaceable pulley part, said first point of connection being axially spaced from said second point of connection, and said third point of connection being axially spaced from said fourth point of connection, the axial spacing between said first and second points of connection being equal to the axial spacing between said third and fourth points of connection.

6. Variable pulley according to claim 1 wherein the spacings between points of connection at which said connecting means are firmly linked, on the one hand, to the respective axially displaceable at least one pulley part and, on the other hand, to the part of the drive which is synchronously and concentrically rotatable with the respective axially displaceable at least one pulley part, at least within one of said two systems, are of equal size.

7. Variable pulley according to claim 1 including first points of connection at which said connecting means of one of said systems are firmly linked, on the one hand, to the respective axially displaceable one pulley part, and second points of connection at which said connecting means of the other of said systems are secured, on the one hand, to the part of the drive which is rotatable synchronously and concentrically with the respective axially displaceable one pulley part, both said first and said second points of connection being respectively on the same diameter.

8. Variable pulley according to claim 7 including third points of connection at which said connecting means of said one of said systems are firmly linked, on the other hand, to the part of the drive which is rotatable synchronously and concentrically with the respective axially displaceable one pulley part, and fourth points of connection at which said connecting means of said other of said systems are firmly linked, on the other hand, to the respective axially displaceable one pulley part, both said third and said first points of connection being respectively on the same diameter.

9. Variable pulley according to claim 1 wherein said systems affording axial displacement of said at least one pulley part are connected, fixed against relative rotation to a shaft of the drive which is rotatable synchronously and concentrically with said at least one pulley part.

10. Variable pulley according to claim 1 wherein said systems affording axial displacement of said one pulley part are connected, fixed against relative rotation, to the other pulley part.

11. Variable pulley according to claim 1 wherein each of said systems includes means for connecting the two pulley parts to one another.

12. Variable pulley according to claim 1 wherein each of said systems includes a plurality of means for connecting the two pulley parts to one another.

13. Variable pulley according to claim 1 wherein said connecting means are formed of flexible, leaf spring-like metal members.

14. Variable pulley according to claim 1 wherein said connecting means, as viewed in axial direction, extend chordlike to the pulley parts.

15. Variable pulley according to claim 1 wherein said connecting means, as viewed in direction of force flow through the pulley, are stressed in tension.

16. Variable pulley according to claim 5 wherein at least one of said points of connection is located radially within the smallest possible diameter of the pulley subjectible to the tension medium strand.

17. Variable pulley according to claim 1 wherein said connecting means of one of said systems are firmly linked at at least two connecting points to said at least one axially displaceable pulley part and are also firmly linked at at least one connecting point to the part of the drive which is rotatable synchronously and concentrically with said one axially displaceable pulley part; and said connecting means of the other of said systems are firmly linked to the part of the drive which is rotatable synchronously and concentrically with said one axially displaceable pulley part and are also firmly linked at at least one connecting point to the respective axially displaceable pulley part.

18. Variable pulley according to claim 1 wherein said connecting means of both said systems, as viewed perpendicular to the axis of the pulley, are located, respectively, on both sides of said tension medium strand.

19. Variable pulley according to claim 1 wherein said connecting means of one of said systems are secured at at least one connecting point, on the one hand, to the respective axially displaceable pulley part and, on the other hand, to spacer means extending in axial direction through said axially displaceable pulley part and disposed at the part of the drive which is rotatable synchronously and concentrically to the axially displaceable pulley part; and said connecting means of the other of said systems are secured at at least on connecting point, on the one hand, to the other of said pulley parts and, on the other hand, to spacer means extending in axial direction through said other of said pulley parts and disposed at the respective axially displaceable pulley part.

20. Variable pulley according to claim 1 wherein said connecting means exert on axial pre-tensioning force upon the respective axially displaceable pulley part.

21. Variable pulley according to claim 1 wherein said connecting means exert an axial pre-tensioning force on said pulley parts mutually urging said pulley parts towards one another.

22. Variable pulley according to claim 1 including compression spring means for urging said pulley parts toward one another.

23. Variable pulley according to claim 22 wherein compression spring means comprises a plate spring.

24. Variable pulley according to claim 1 wherein the variable pulley serves as a speed control pulley for a transmission system, including compression spring means in the form of at least one plate spring urging said pulley parts toward one another, said compression spring means being located on at least one side of the primary and secondary sides of the transmission, and including centrifugal weights on said compression spring means.

25. Variable pulley according to claim 24 wherein said centrifugal weights are located on said compression spring means on the primary side of the transmission so as to effect a widening of the spacing between the pulley parts against the applied force of said compression spring means, with increasing rotary speed of the transmission.

26. Variable pulley according to claim 24 wherein said centrifugal weights are located on said compression spring means on the secondary side of the transmission so as to effect a narrowing of the spacing between the pulley parts in the direction of the applied force of said compression spring means, with increasing rotary speed of the transmission.

27. Variable pulley according to claim 24 wherein said centrifugal weights are provided on said compression spring means on said primary side was well as on said compression spring means on said secondary side of said transmission so as to effect on said primary side a widening of the spacing between the pulley parts against the applied force of said compression spring means, with increasing rotary speed of the transmission, and so as to effect on said secondary side a narrowing of the spacing between the pulley parts in the direction of the applied force of said compression spring means, with increasing rotary speed of the transmission.

28. Variable pulley according to claim 24 wherein said centrifugal weights are so disposed on said compression spring means on the primary side of the transmission so as to effect a narrowing of the spacing between the pulley parts in the direction of the applied force of said compression spring means, with increasing rotary speed of the transmission.

29. Variable pulley according to claim 24 wherein said centrifugal weights are so disposed on said compression spring means on the secondary side of the transmission so as to effect a widening of the spacing between the pulley parts against the applied force of said compression spring means, with increasing rotary speed of the transmission.

30. Variable pulley according to claim 24 wherein said centrifugal weights are so disposed on said compression spring means on the primary side as well as on said compression spring means on the secondary side of the transmission so as to effect, on the primary side, a narrowing of the spacing between the pulley parts in the direction of the applied force of said compression spring means, with increasing rotary speed, and so as to effect, on the secondary side, a widening of the spacing between the pulley parts against the applied force of said compression spring means with increasing rotary speed.

31. Variable pulley according to claim 24, wherein said compression spring means comprises at least one plate spring, and said centrifugal weight is formed of said plate spring per se.

32. Variable pulley according to claim 1 wherein the variable pulley serves as a variable drive, and including adjusting means applicable in axial direction to the respective axially displaceable pulley part for adjusting the spacing between the axially displaceable pulley part and the other pulley part.

* * * * *